United States Patent

[11] 3,587,047

[72] Inventor Alfred Cutaia
Rochester, N.Y.
[21] Appl. No. 695,474
[22] Filed Jan. 3, 1968
[45] Patented June 22, 1971
[73] Assignee International Business Machines Corporation
Armonk, N.Y.

[54] SELECTIVE CHARACTER CENTERING LINE FOLLOW LOGICS

5 Claims, 14 Drawing Figs.

[52] U.S. Cl. .......... 340/146.3 AH
[51] Int. Cl. .......... G06k 9/04
[50] Field of Search .......... 340/146.3

[56] References Cited

UNITED STATES PATENTS

| | | | |
|---|---|---|---|
| 3,142,761 | 7/1964 | Rabinow | 340/146.3 X |
| 3,231,860 | 1/1966 | Chatten | 340/146.3 |
| 3,295,105 | 12/1966 | Gray et al. | 340/146.3 |
| 3,264,608 | 8/1966 | Gattner et al. | 340/146.3 |
| 3,506,807 | 4/1970 | Malaby | 340/146.3 AH |

*Primary Examiner*—Maynard R. Wilbur
*Assistant Examiner*—Leo H. Boudreau
*Attorney*—Sughrue, Rothwell, Mion, Zinn and Macpeak

ABSTRACT: A character recognition scanner is vertically centered on a line of characters by horizontally compressing or consolidating the character parts in the field of view of the scanner and using the horizontally consolidated character parts as a cue to vertically adjust the scanner. The horizontally consolidated character parts are stored in a shift register by a series of bits and the positions of the series of bits in the shift register corresponds to the position of the character parts in the field of view of the scanner. By shifting the data in the shift register in coincidence with the vertical adjustment of the scanner, the data in the shift register serves as a continuous cue of the position of a character within the adjusted field of view. The vertical adjustment of the scanner is then stopped when the series of bits representing a character is at a predetermined position within the shift register.

INVENTOR
ALFRED CUTAIA
BY Sughrue, Rothwell, Mion, Zinn & Macpeak
ATTORNEYS

FIG.4
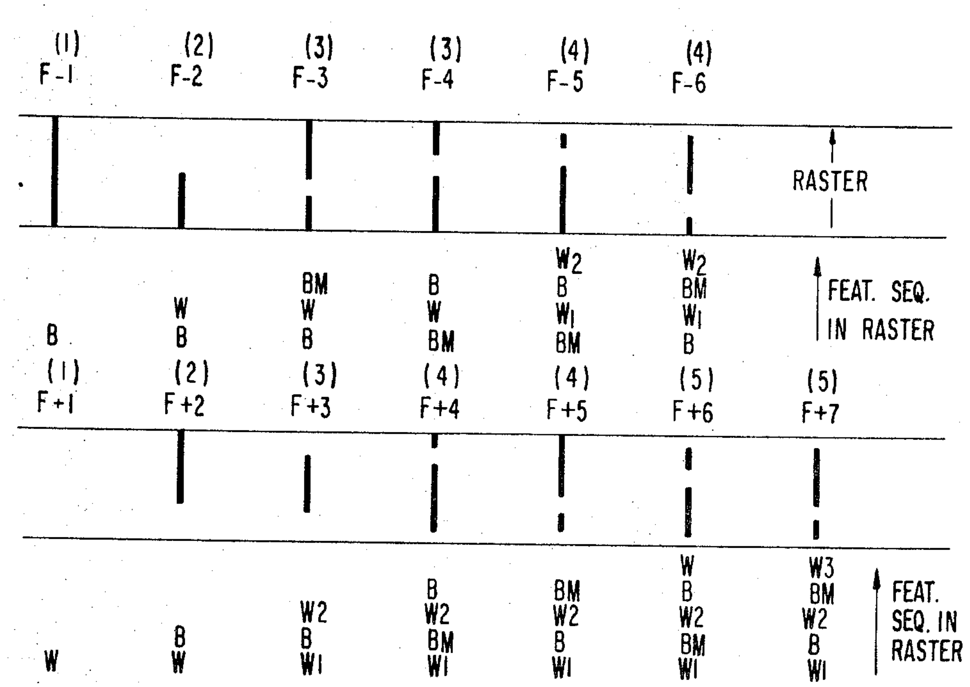
FIG.6
CLOCK SOURCE
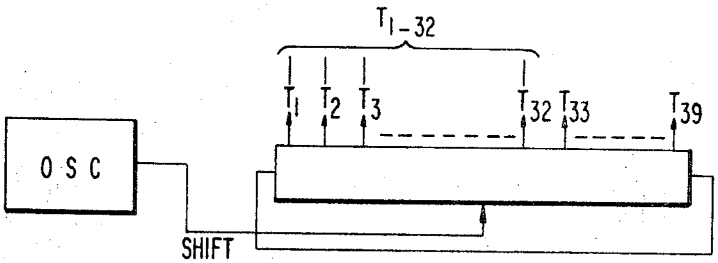
FIG.7 DIRECTION GATE AND CONSOLIDATION REGISTER
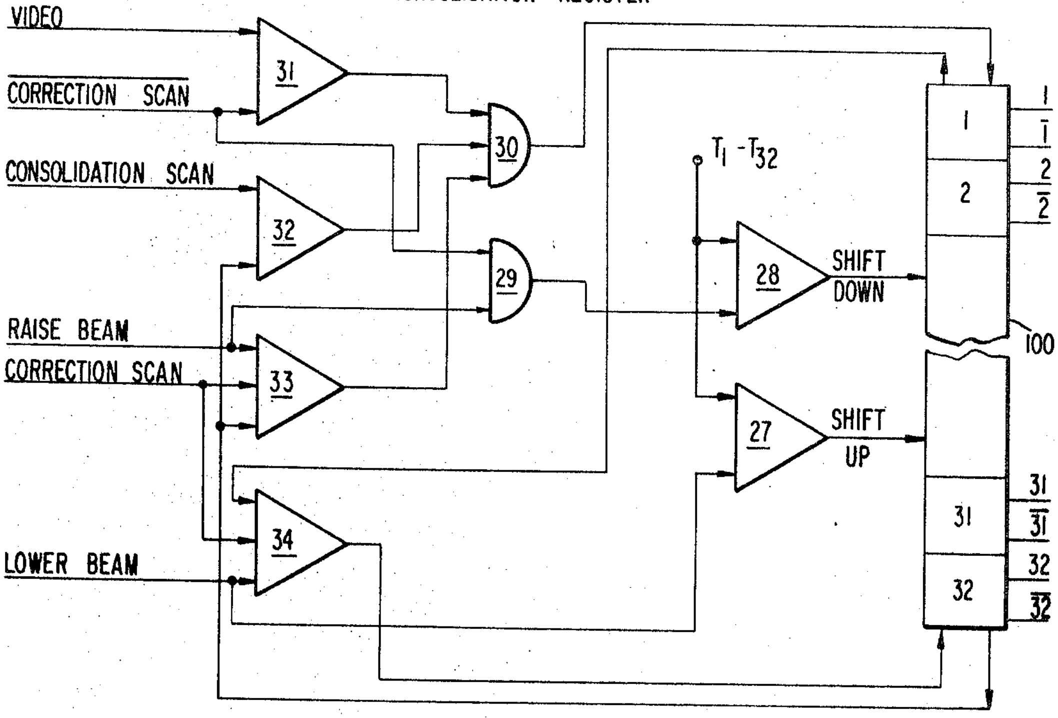

SELECTIVE CHARACTER CENTERING LINE FOLLOW LOGICS

BACKGROUND

The invention is in the field of character recognition systems and more particularly is a line centering system for use in a character recognition system.

There are many types of character recognition systems known in the prior art. Typically, in such systems, a scanning means such as a flying spot optical scanner scans a medium on which characters are stored and provides one type of output electrical signals in response to the scan of the character and another type of output electrical signal in response to a scan of the background. The character recognition logic receives the scanner output signals and makes a decision as to the character identity. As examples, optical scanners may distinguish black characters from white backgrounds, or vice versa, and magnetic scanners may distinguish between characters written with magnetic ink and the nonmagnetic background. Since the signals from the scanner output only inform the logic whether the scanner is instantaneously viewing a spot on the character or a spot on the background, it is necessary to provide position signals to the recognition logic. The position information supplied corresponds to the movement of the scanner.

The scanner usually performs a patterned scan which covers a certain area somewhat larger than the expected character size. The patterned scan of one character in a line is followed by the patterned scan of the next character in the line, and so on. When the scan reaches the end of a line it jumps to the next line and begins again. The jump is designed to be equal to the vertical distance between character lines but as is well known, due to character placement imperfections vertical misregistration of character or other reasons, the jump from one line to the next sometimes ends up with the character to be scanned being partially outside of the patterned scan. When this occurs, the recognition system will not receive sufficient information about the character to make a decision as to its identity.

SUMMARY OF THE PRESENT INVENTION

In accordance with the present invention, the scanner is provided with a vertical adjustment signal to position the patterned scan so that the character to be scanned is substantially in the center of the patterned scan. Following a jump from one line to the next, the field of view of the scanner is completely scanned by an ordinary vertical raster-type scan. The entire pattern of characters or character parts within the field of view of the scanner is then used to vertically adjust the field of view of the scanner. The results of all vertical scans during the raster scan are effectively superimposed, with the character signals taking precedence over the background signals, to form a horizontal consolidation of the character or character parts within the field of view of the scanner.

The horizontal consolidation results in a pattern, representing the vertical position of the character and character parts in the field of view, which can be used to determine if the scanner should be adjusted, how much should it be adjusted, and in what direction. Furthermore, since the relative sizes of the consolidated character parts are known, a correct decision can be made as to which of the character parts should be centered in the field of scan.

BRIEF DESCRIPTION OF DRAWINGS

FIG. 4 illustrates a plurality of consolidated patterns each of which is electronically generated in response to particular relative alignments of the character to be scanned and the raster pattern of the scanner.

FIG. 6 is a block diagram of a clock source useful in the present invention.

FIGS. 7—14 are detailed logic diagrams illustrating parts of the general block diagram of FIG. 5.

In FIGS. 1, 2 and 3, there are shown portions of three lines of printed characters. Although the characters are shown only by their outlines, it is assumed that they are solid characters. Furthermore, for the purpose of a specific embodiment described herein it is assumed that the characters are solid black and the background is white although the invention is applicable to other types of background versus character distinguishing features. As stated above, one of the problems in character recognition systems is to center the scanner on the line to be scanned. For example, following a complete scan of line N-1 it is desirable that the scanner be centered on the character 7, which is assumed to be the first character of line N.

In the drawings, the vertical lines represent the individual scan lines occuring during a vertical raster scan of the character. It will be noted that the raster pattern of FIG. 1 is substantially perfect since the character "7" is properly centered with respect to the raster scan. FIG. 2 shows a case wherein the raster is too high and FIG. 3 shows a case wherein the raster is too low. In the specific embodiment described herein it is assumed that each vertical scan begins at the bottom of the raster pattern and ends at the top, the flyback (not shown in the drawings) consequently being from top to bottom. By means of timing pulses, each vertical scan line is divided into 32 increments. As is well known in the art, when the scanner intercepts a white space, the electrical signal produced (video for an optical scanner) is at one level whereas when the scanner intercepts a black space, the video is at a second level. During the description of the preferred embodiment herein, the level of the video caused by the scanner intercepting a white background will be referred to as a binary 0, or white bit, and the level for the signal caused by the scanner intercepting the black character will be referred to as a binary 1 or a black bit.

In accordance with the line centering apparatus of the present invention, the position of the raster, referred to as the raster reference point, raster reference position or scanner field of view, is vertically raised or lowered to place it in proper vertical registration with the line to be read by the character recognition system. In FIG. 2 it is apparent that the raster reference position must be lowered, whereas in FIG. 3 it is apparent that the raster reference position must be raised. It should be noted that the particular system for recognizing the characters and the particular manner in which the characters are scanned following the aligning of the raster reference position with the characters is not a part of the present invention. Systems for performing those functions are well known in the art and may be used in connection with the present invention.

The cue which the present invention uses to determine how to properly align the raster reference position is the horizontal consolidation of the character and character parts within the scanner field of view. Horizontal consolidation as used herein means the compression of the character or character parts, within the field of view, in a horizontal direction. As an example, the horizontal consolidation of the character found in the scanner field of view shown in FIG. 1 results in a pattern illustrated in FIG. 4 by the designation $F_{+3}$. Note, the pattern is a white space at the bottom of the scan, a black bar in the middle of the scan and a white space at the top of the scan. The black bar represents the character "7" compressed horizontally. The combination of black bars and white spaces resulting from a horizontal consolidation are referred to as feature combinations. The feature combination resulting from the raster scan of FIG. 2 is illustrated by the feature combination $F_{11}$ of FIG. 4. Note that the bottom black bar in the feature combination is larger than the top black bar. The bottom black bar represents a portion of the character "7" horizontally compressed and the top black bar represents a portion of the character "6" horizontally compressed. The feature combination for the scan shown in FIG. 3 is $F_{13}$.

Figure 1:
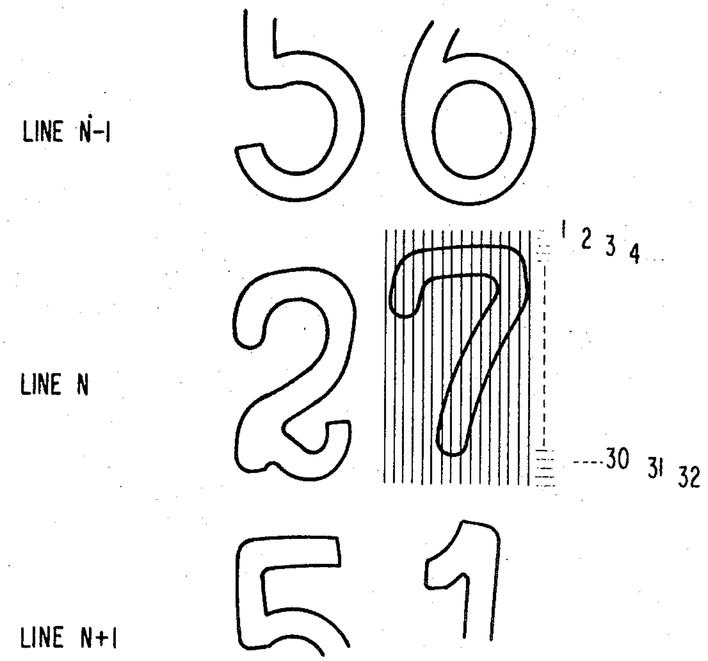
FIG. 1 illustrates the proper vertical registration of a scanner raster pattern with respect to a line of characters to be recognized.
Figure 2:
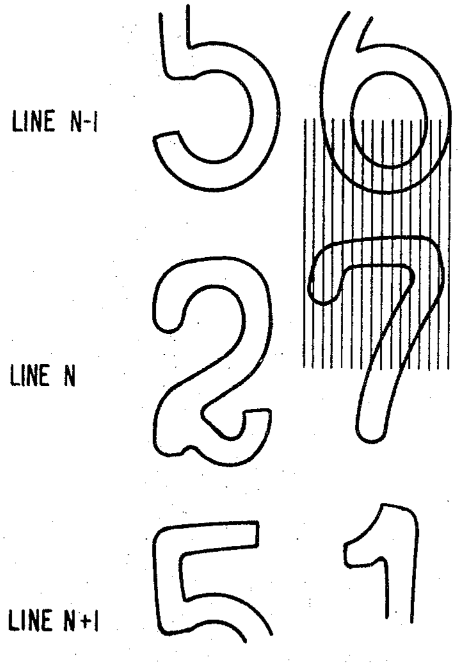
FIGS. 2 and 3 illustrate vertical misregistration of a scanner raster pattern with respect to a line of characters to be recognized.
Figure 3:
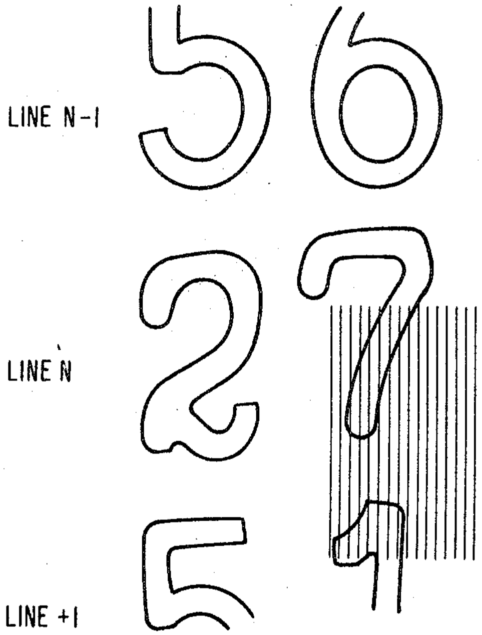

Although FIGS. 1, 2 and 3 only show 3 different feature combinations resulting from horizontal consolidation, it will be apparent that there are many other feature combinations. The 13 feature combinations shown in FIG. 4 represent those which can serve as cues for centering the scan in the specific embodiment described herein. The $F_i$features shown at the top of the page illustrate those combinations starting with the black bar at the bottom of the scan, and the combinations labeled $F_+$ illustrate those starting with a white space at the bottom of the scan. The numbers in parentheses above the F numbers relate to the count in a sequence counter for the existence of the corresponding feature combination. The sequence counter will be explained in more detail hereafter, but for the present it should be understood that the number in parentheses corresponds to 1 plus the number of changeovers in the feature combination. For example, in feature $F_{13}$ there are two changeovers going from the bottom of the scan to the top of the scan. There is a change from black to white and then from white to black. Two plus one is three and therefore the sequence counter contains a count of three whenever the feature combination $F_{13}$ exists in the consolidation register.

Below each combination is defined a sequence of black-white features, in ascending order, starting from the bottom of the scan to the top of the scan. It should be noted that when two black features occur, the largest is defined as the major black feature ($B_m$) indicating that feature is the one to correctly center the raster on. The size of the black feature could be used to define the difference between an upper case character, a lower case character and a format line, or for centering criteria. In accordance with the present invention, the size of the black feature is used as a cue in the centering logic. The particular rules used in centering the scan on the line of characters is not critical to the present invention and may vary from system to system. However, for the purpose of describing a preferred detailed embodiment, it is assumed that the following rules are used:

1. Position a $B_m$ feature above the bottom of the scan by a length equivalent to 4 bits (an entire scan is equivalent to 32 bits - see FIG. 1), with a white space at the top of the scan.

2. If adjacent line characters descend into the feature combination, causing a second black feature within the consolidated pattern then the best that can be done is to maintain the $B_m$ bottom reference as described above resulting in combinations similar to that shown as $F_{+4}$ or $F_{+6}$.

3. 3) After the initial character centering has been made, the only feature combinations which will be accepted as correctly centered characters for recognition by the character recognition system will be feature combinations $F_{+3}$, $f_{+4}$ and $F_{+6}$. Since each feature combination is unique, the rules above can be expanded to handle special cases without modifying the above conditions.

The invention also includes means for setting up a black magnitude criteria and determining if the black bars of a feature combination satisfy the black magnitude criteria. The two black magnitude criteria used are:

1. A black bar to be acceptable for centering must be between 8 and 25 bits in length.

2. If there are two black bars within a feature combination, in order for the largest black feature to be acceptable for centering the raster, it must be larger than the other black feature by at least 4 bits, i.e. $B_m - B \geq 4$ bits.

The raster correction procedure followed in response to the occurrence of the different feature combinations are shown in Table I below. In Table I, the featured combination numbers are shown in the left hand column; the black magnitude criteria which must be satisfied are shown in the middle column; and the procedure for correcting the raster reference position is shown in the right hand column. In the right hand column some of the terms described have the following meaning:

1. TWR (top white reference) means a white space at the top of the raster of 6 bits in length.

2. BWR (bottom white reference) means a white space at the bottom of the raster of 4 bits in length.

3. > BWR means a white space at the bottom of the raster which is greater than 6 bits in length.

< BWR means a white space at the bottom of the raster which is less than 6 bits in length.

5. As illustrated in FIG. 4, W refers to the white space in the feature combination when there is only a single white space. When there are two or more white spaces in a feature combination, $W_1$ refers to the bottom white space and $W_2$ refers to the next highest white space.

TABLE I

| Feature combination number | Black feature magnitude criteria | Raster correction procedure |
|---|---|---|
| $F_{-1}$ | | None since $B>25.25$. |
| $F_{-2}$ | $25 \geq B \geq 8$ | Lower to $W=TWR$. |
| $F_{-3}$ | $25 \geq B_m \geq 8$; $\lvert B_m - B \rvert \geq 4$ | Raise to $W=BWR$. |
| $F_{-4}$ | $25 \geq B_m \geq 8$; $\lvert B_m - B \rvert \geq 4$ | Lower to $W=TWR$. |
| $F_{-5}$ | $25 \geq B_m \geq 8$; $\lvert B_m - B \rvert \geq 4$ | Lower to $W_1=TWR$. |
| $F_{-6}$ | $25 \geq B_m \geq 8$; $\lvert B_m - B \rvert \geq 4$ | Raise to $W_1=BWR$. |
| $F_{+1}$ | | None since $B=0<5$. |
| $F_{+2}$ | $25 \geq B \geq 8$. | Raise to $W=BWR$. |
| $F_{+3}$ | $25 \geq B \geq 8$ | Raise to BWR if $W_1>BWR$. Lower to BWR if $W_1<BWR$. None if $W_1=BWR$. |
| $F_{-4}$ | $25 \geq B_m \geq 8$; $\lvert B_m - B \rvert \geq 4$ | Same as for $F_{+3}$. |
| $F_{-5}$ | $25 \geq B_m \geq 8$; $\lvert B_m - B \rvert \geq 4$ | Raise to $W_2=BWR$. |
| $F_{+6}$ | $\lvert B_m - B \rvert \geq 4$ | Same as for $F_{+3}$. |
| $F_{+7}$ | $\lvert B_m - B \rvert \geq 4$ | Raise to $W_2=BWR$. |

The correction procedure can be further understood by considering a specific example. Assume that the scanner field of view is too low, as illustrated in FIG. 3. The horizontal consolidation of the character parts within the field of view will result in the feature combination $F_{13}$. In order for the correction procedure to be followed by the invention, the black magnitude criteria for $F_{13}$ must be satisfied. As shown in table I, the black magnitude criteria are: $B_m$ must be between 25 and 8 bits in length, and the absolute value of $B_m - B$ must be greater than or equal to 4 bits. Assuming that the black magnitude criteria are satisfied, the raster correction procedure is to raise the raster reference position until the white space between the two black features is at the bottom white reference position. Thus, the raster is raised until the distance between the bottom of the raster and the bottom of character 7 is 6 bits in length.

General Block Diagram

Figure 5:
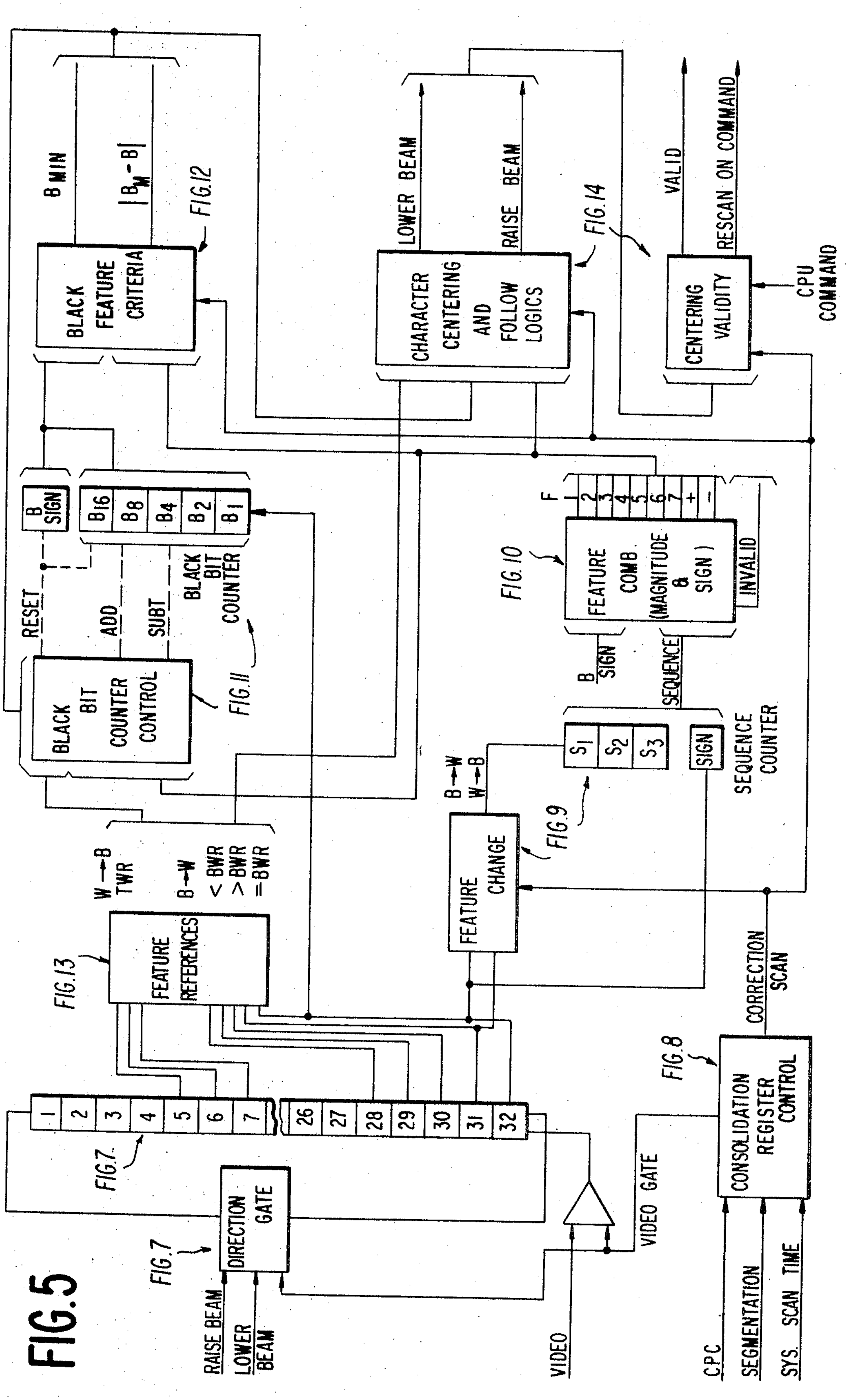
FIG. 5 is a general block diagram of a preferred embodiment of the present invention.

The general block diagram of a preferred embodiment of the present invention shown in FIG. 5 and comprises twelve basic logic blocks or logic groupings. These twelve logic blocks are illustrated in detail in FIGS. 7 through 14, with each individual logic block being detailed in the Figure indicated by the number appearing adjacent thereto.

Clock Source

Each vertical scan is divided into 32 parts by a source of clock pulses. An example of apparatus for forming the clock pulses is shown in FIG. 6 and includes an oscillator and a ring-around shift register having 39 stages. The oscillator pulses shift the single 1-bit in the shift register to provide the timing pulses $T_1$ through $T_{39}$. The pulse $T_1$ may be used, in a well known manner, to start each vertical scan, and the pulse $T_{33}$ may be used also in a well known manner to initiate fly-back of the scan. The particularly circuitry for scanning the field forms no part of the present invention and many such circuits are well known in the art. The timing pulses are shown to illustrate how the consolidation register divides the vertical scan into 32 parts.

Consolidation Register, Direction Gate and Register Control

The consolidation register is operative to store a pattern of 1's and 0's corresponding to the feature combinations illustrated in FIG. 4. In the specific example described herein a series of 1's represents a black bar of the feature combination and a series of 0's represents a white space of the feature combination. The consolidation register is a bidirectional shift register capable of shifting its contents up or down in response to trigger pulses at the shift down and shift up input terminals. The shift register is also capable of receiving inputs at either the upper stage, indicated as stage 1, or the lower stage, indicated as stage 32. The direction of shifting is controlled by the direction gate indicated in FIG. 5 and detailed in FIG. 7. The mode of operation of the register is controlled by the consolidation register control means shown in FIG. 8. There are two basic modes of interest. The first is the consolidation scan mode during which the characters in the field of the scan are effectively compressed in a horizontal direction. The second mode is the correction scan mode during which the raster is raised or lowered to a new raster reference point and the feature combination pattern within the consolidation register is shifted up or down until the proper TWR or BWR reference points are reached.

The consolidation scan does not start as soon as a black area is intercepted by the beam during the raster scan. This is because the paper may have dirt or other imperfections on it which could cause the generation of a pulse indicating a black background. Instead, the consolidation scan is started in response to a CPC signal which is a "character present signal." The CPC signal indicates that the beam is scanning a character. It should be noted that both CPC signals and "segmentation signals," which are used herein, may be generated by apparatus taught in copending commonly assigned patent application Ser. No. 504,457 filed Oct. 24, 1965, titled "Character Separation Apparatus for Character Recognition Machines." A CPC signal is generated when two vertically adjacent bits are found in two horizontally adjacent scans, thereby indicating the presence of a character. The segmentation signal is generated as a result of any of several conditions, one of which is three blank (white) scans. Thus, the segmentation signal indicates the end of character.

At time $T_{34}$ of some previous cycle, latch 20 (FIG. 8) is reset thereby providing one input to AND gate 26. When the scan intercepts a character and provides a CPC signal, AND gate 26 is energized to set latch 22. When set, latch 22 provides an output which places the system in the consolidation scan mode. The lower output of latch 20 corresponds to a NOT CORRECTION SCAN, which energizes the lower input of AND gate 28 (FIG. 7) via OR gate 29. During the time of a NOT CORRECTION SCAN, timing pulses $T_1$ through $T_{32}$ shift the data in consolidation register 100 in the downward direction. The consolidation scan input energizes the upper input to AND gate 32 thereby providing a ring-around connection from stage 32 of the consolidation register through AND gate 32, OR gate 30 and back to stage 1 of the consolidation register. Thus, a ring-around shift register is provided during the consolidation scan. It will also be noted that the video data, (binary 1 level bits corresponding to black intercepts and binary 0 level bits corresponding to white intercepts of the scanning beam) also pass through OR gate 30 to stage 1 of the consolidation register during a consolidation scan. Consolidation in a horizontal direction of the characters within the field of the scan is thereby provided since all the binary 1's located in the consolidation register during a previous scan are placed back into the consolidation register in all subsequent scans, plus new binary 1's from additional black areas are entered into the consolidation register.

The consolidation register, in the manner described, continues to consolidate the character pattern in a horizontal direction until a segmentation signal is received. As mentioned above, the segmentation signal indicates an end of character. The segmentation signal is ANDed (FIG. 8) with timing pulse $T_{39}$ in AND gate 24 to SET latch 20. The output of latch 20 when set is the correction scan controlling signal. As a result of latch 20 being SET, the following takes place. Latch 22 is reset thereby removing the consolidation scan input from AND gate 32. Also, the NOT CORRECTION SCAN inputs to AND gate 31 and OR gate 29 are removed. The correction scan input provides one input to AND gates 33 and 34. During the correction scan mode, the shift direction of the consolidation register depends upon whether there is a command to raise the beam reference point or lower the beam reference point. The logic for providing the latter two commands will be described in more detail hereafter, but for the present it is sufficient to assume that either a raise beam or a lower beam command is received. If a raise beam command is received, AND gate 33 is energized thereby providing a ring-around for the consolidation 100 from stage 32 to stage 1, and also providing shift down pulses to the shift register via AND gate 28. If, on the other hand, a lower beam command is received, AND gate 34 is energized thereby providing a ring-around for the consolidation register from stage 1 to stage 32 and also providing shift up impulses to the shift register via AND gate 27. It will be noted that when the beam is lowered to correct the vertical position, the pattern in the shift register is raised, and when the beam is raised to correct the vertical positioning, the pattern in the shift register is lowered. Each stage of the shift register 100 provides two outputs indicated by the number of the stage and the number of the stage with a bar over it, i.e., when the stage N contains a binary 1, the N output from that stage is true, whereas the $\overline{N}$ output is true when the stage contains a binary 0.

Feature Change Logic and Sequence Counter

Figures 8, 9, 10:
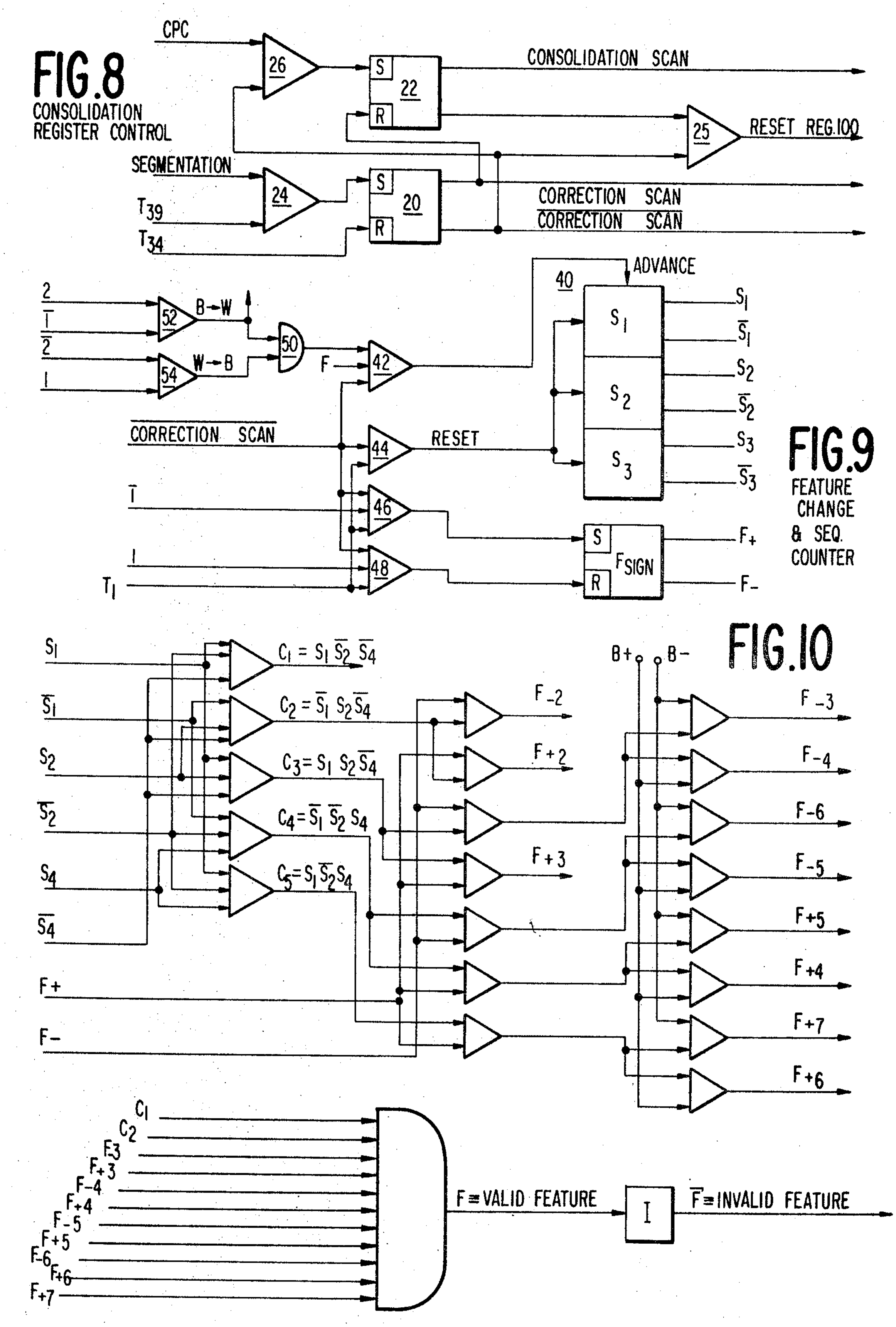

The feature change logic and the sequence counter illustrated in detail in FIG. 9, operate to count the changes from black to white and white to black during each vertical scan during the consolidation scan mode. At time $T_1$ of every scan during the consolidation scan, which is the same as a NOT CORRECTION SCAN, AND gate 44 resets the three-stage binary counter 40.

Also at time $T_1$, the $F_{stan}$ latch is set to $F_+$ if the bottom of the scan is white (binary 0), or is reset to $F_1$ if the bottom of the scan is black (binary 1). A 1 output from the first stage of the consolidation register at time $T_1$ indicates that the bottom of the scan is black, and a $\overline{\mathbf{1}}$ output from the first stage of the consolidation register indicated that the bottom of the scan is white. It will be noted that the reset input to binary counter 40 does not reset the counter to zero but resets it to a count of one. Following the time $T_1$ the binary counter 40 accumulates one input for each changeover from black to white or from white to black during the vertical scan. The black to white changeover is indicated by ANDing the 2 and $\overline{\mathbf{1}}$ outputs from consolidation register 100 in AND gate 52. The white to black changeover is indicated by ANDing the $\overline{\mathbf{2}}$ and 1 outputs from the consolidation register 100 in AND gate 54. The black to white and white to black indications pass through OR gate 50 and AND gate 42 to the input terminal of counter 40. It will be noted that AND gate 42 only sends advance pulses to the counter 40 during the existence of a NOT CORRECTION SCAN input and during the existence of a control input F. The control input F, as will be shown hereafter, means that there is a valid feature combination in the consolidation register. An invalid feature combination would be one other than one of the 13 shown in FIG. 4. Thus, during each vertical scan of the consolidation scan mode, the binary counter 40 contains a binary number corresponding to one of the numbers in parenthesis above the feature combination patterns shown in FIG. 4.

Feature Combination Logics

The S outputs from synchronous counter 40 (FIG. 9) indicate a count in binary form, and the $F_+$ and $F_1$ outputs indicate whether the feature combination in the consolidation register is an $F_+$ feature or an $F_1$ feature. These outputs plus $B_1$ and $B_+$ signals are entered into feature combination logic which is shown in detail in FIG. 10. The feature combination logic provides outputs indicating which of the feature combinations is presently in the consolidation register 100. The $B_+$ and $B_1$ inputs to the feature combination logic are generated by logic to be described more fully hereafter. For present purposes, it is sufficient to understand the meaning of the $B_+$ and $B_1$ terms. These terms only have significance for feature combination patterns in which there are two black bars, e.g. $F_{16}$. The term $B_1$ means that the upper black bar of the feature combination is the one having the maximum length, and $B_+$ means that the lower black bar of the feature combination is the one having the maximum length.

The logic for generating the feature pattern signals is illustrated in FIG. 10, wherein the C outputs represent actual counts of the sequence counter and the F outputs represents the respective feature combinations. An F output without any subscript means that there is a valid feature, whereas an $\overline{F}$ output means that there is an invalid feature. The logic illustrated can be understood by considering one example of the Boolean expression for one of the feature combinations. Referring back to FIG. 4, and considering feature $F_{16}$ as an example, it can be seen that $F_{16}$ should result in a count in a sequence counter of four. This corresponds to the existence of the term $C_4$ in the Boolean expression for $F_16$. Also, the upper black bar is the one having the maximum length and therefore the term $B_1$ should be in the Boolean expression for feature combination $F_{16}$. Since $F_{16}$ has a black bar at the bottom of the scan, the term $F_1$ should also be in the Boolean expression. Thus, the total expression for $F_{16}$ is $$F_{16}=(B_1)\cdot(FAY1)\cdot(CA4)$$

It can be seen that the Boolean expression is carried out by the AND gates of FIG. 10.

Black Bit Counter and Counter Control

The black bit counter and the black bit counter control logic operate to determine the length of the black bars in the consolidation register. In general, the feature combination outputs from the feature combination logics of FIG. 10 and other control signals to be indicated more fully hereafter, are applied to the black bit counter control logics. The latter commands the black bit counter to count the binary 1's which are continuous in the consolidation register thereby indicating the length of a black bar. Also, following the counting of the first group of continuous binary 1's in the consolidation register, the black bit counter operates to subtract the second group binary 1's which corresponds to the second black bar in a feature combination. This results in a measure of the difference between the first and second black bars. As will be remembered from the discussion above, the criteria to be satisfied for the black features is that a black feature must be at least 8 bits in length in order to be useful to the present invention and if there are two black bars, the largest must be greater than the smallest by at least 4 bits in length.

Figure 11:
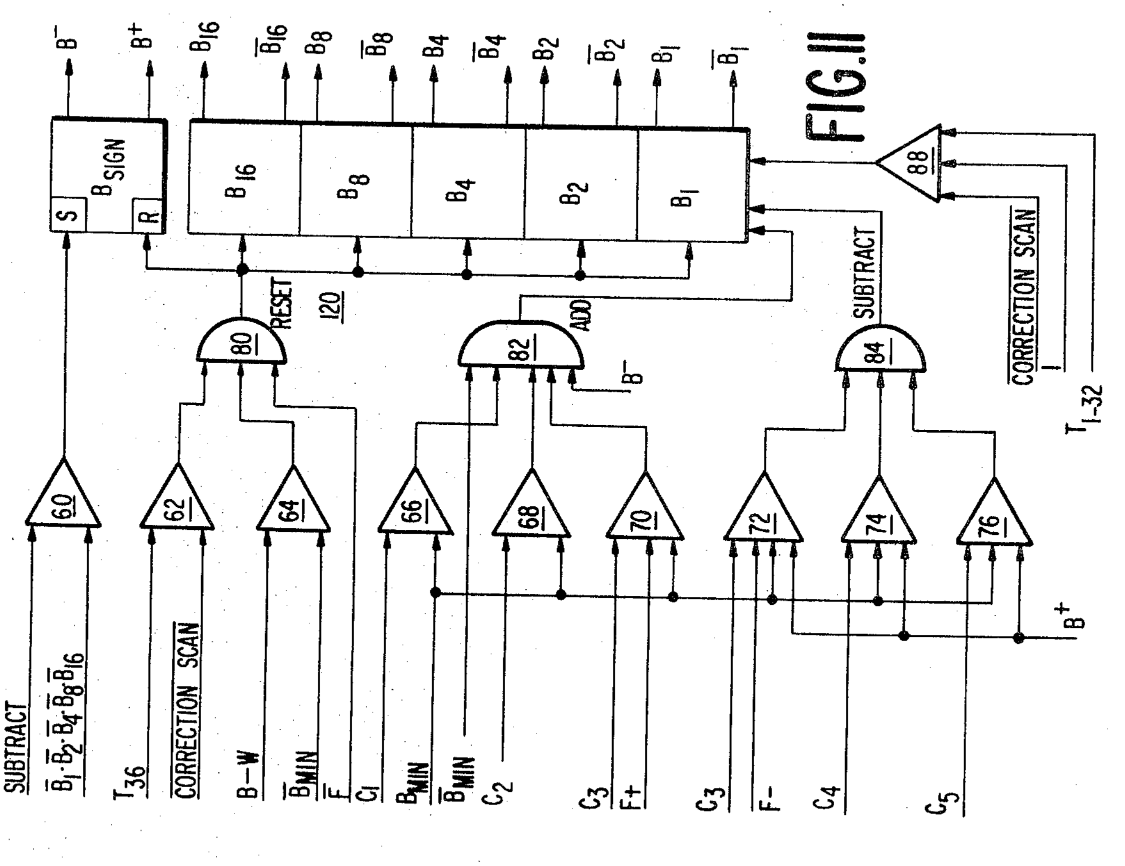

Referring to FIG. 11, at time $T_{36}$ during each scan of the consolidation mode, AND gate 62 provides an output which passes through OR gate 80 and resets the black bit counter to zero. Also, the $B_{sign}$ latch is reset thereby providing a $B_+$ output. Assuming that the minimum number of black bits required for satisfying the black magnitude criteria has not been counted, the black feature criteria logic, illustrated in detail in FIG. 12, and explained more fully hereafter, will generate the output $\overline{B}_{min}$. The $\overline{B}_{min}$ output passes through OR gate 82 and places the black bit counter 120 which may be a conventional up-down counter in the add mode.

During the vertical scan, from $T_1$ to $T_{32}$, each black bit (binary 1) is entered into the black bit counter 120 via AND gate 88. As soon as the counter accumulates the minimum number of black bits, which is eight for the specific embodiment described, the $\overline{B}_{min}$ output is removed and an output $B_{min}$ becomes true.

When $B_{min}$ becomes true, the control of the mode of the counter is taken over by AND gate 66 through 76. In any case wherein the vertical scan is intercepting the character corresponding to the first black bar, the black bit counter 120 will continue to add the black bits applied thereto. This is insured by AND gates 66, 68 and 70, one of which will be energized as long as the first black bar is being "scanned."

As soon as the character corresponding to the second black bar is reached during the vertical scan, one of the AND gates 72, 74 and 76 will be energized to place the counter 120 in a subtract mode. The counter 120 then proceeds to subtract the length of the second or upper black bar from the length of the first or lower black bar on a bit-by-bit basis. If the second black bar is the smaller of the two, then at the end of the scan the black bit counter, without reverting back to the ADD mode, will contain a count equal to the absolute difference between the black bars. However, if the second black bar is larger than the first, the counter must be reverted to the ADD mode in order to prevent the recording of a negative count in the counter 120. This is also accomplished by the illustrated logic. During subtraction the counter will reach zero since the second black bar, in this assumed example is largest. As that occurs, the $B_{sign}$ latch will be set via AND gate 60 thereby providing a $B_1$ output which passes through OR gate 82 to place counter 120 in the ADD mode for the remainder of the vertical scan.

Black Feature Criteria Logic

Figure 12:
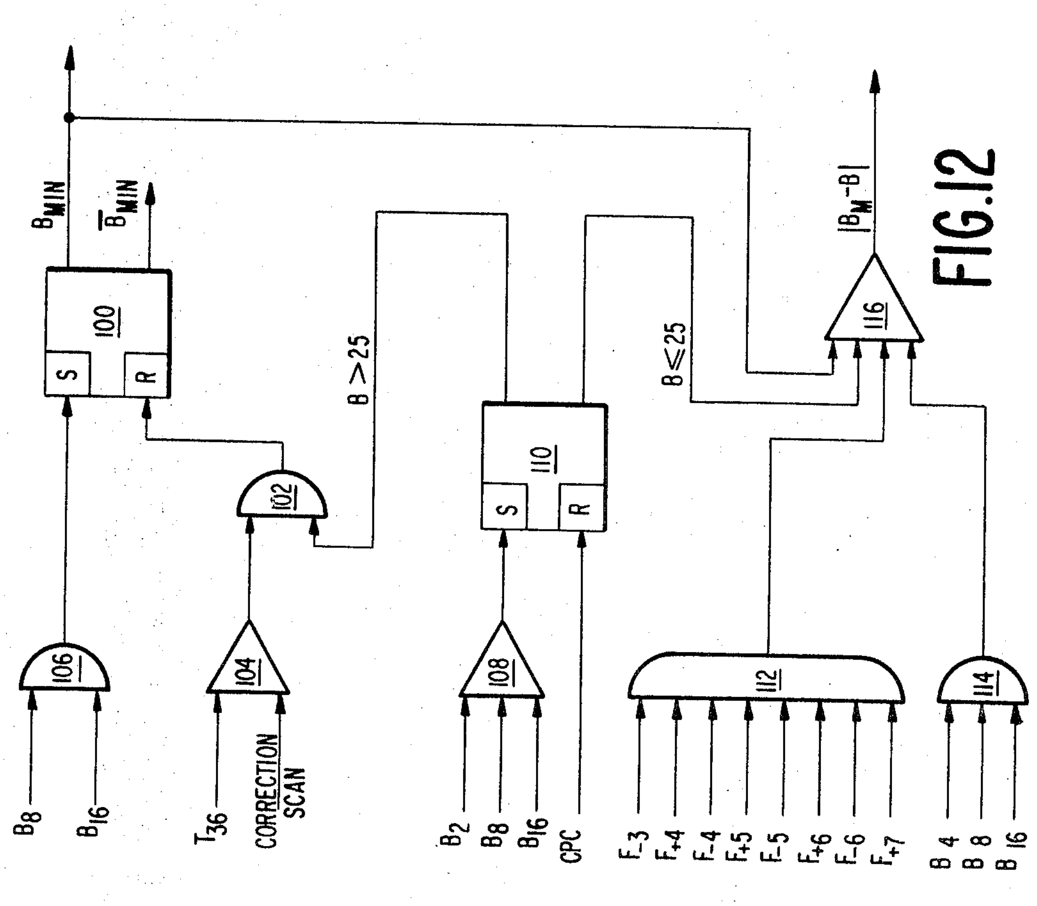

The black feature criteria logic, shown in detail in FIG. 12, provides outputs indicating which of the black feature criteria have been met. At the time $T_{36}$ during the correction scan mode, latch 100 is reset via AND gate 104 and OR gate 102 thereby providing a $\overline{B}_{min}$ output. As soon as the black bit counter 120 accumulates eight black bits, indicating that the black bar is long enough to satisfy the minimum length requirements, OR gate 106 is energized and latch 100 is set. The output of latch 100 when it is set is $B_{min}$. Once it is set, the latch 100 will remain in the set condition during the entire consolidation scan mode unless the black bit counter registers a black bar as being greater than 25 bits in length. If the latter occurs, AND gate 108 is energized to set latch 110 whose output in turn passes through OR gate 102 and resets latch 100. In the absence of a black bar exceeding the maximum length, the latch 100 will not be reset until the termination of the correction scan. Also, if latch 110 is set it will not be reset until the CPC signal for the next character occurs.

The inputs to OR gate 112 represent all of the feature combinations which include two black bars. When these feature combinations exist, it is necessary to know if the other black feature criteria has been satisfied. The other black feature criteria is that the largest black bar be greater than the smallest black bar by at least 4 bits in length. The latter criteria is satisfied when AND gate 116 is energized. Note, that the lowest input to AND gate 116 will be energized whenever the black bit counter registers a count of 4 or above; the next higher input to AND gate 116 will be energized whenever the feature combination is one which has two black bars in it; the next higher input to AND gate 116 will be energized as long as the black bar is not greater than 25 bits in length; and the upper input to AND gate 116 will be energized as long as the $B_{min}$ criteria has been satisfied. The outputs from the black feature criteria logic are applied to the character centering and follow logics, illustrated in detail in FIG. 13, which raise or lower the raster reference position.

Feature Reference Logics

Figures 13, 14:
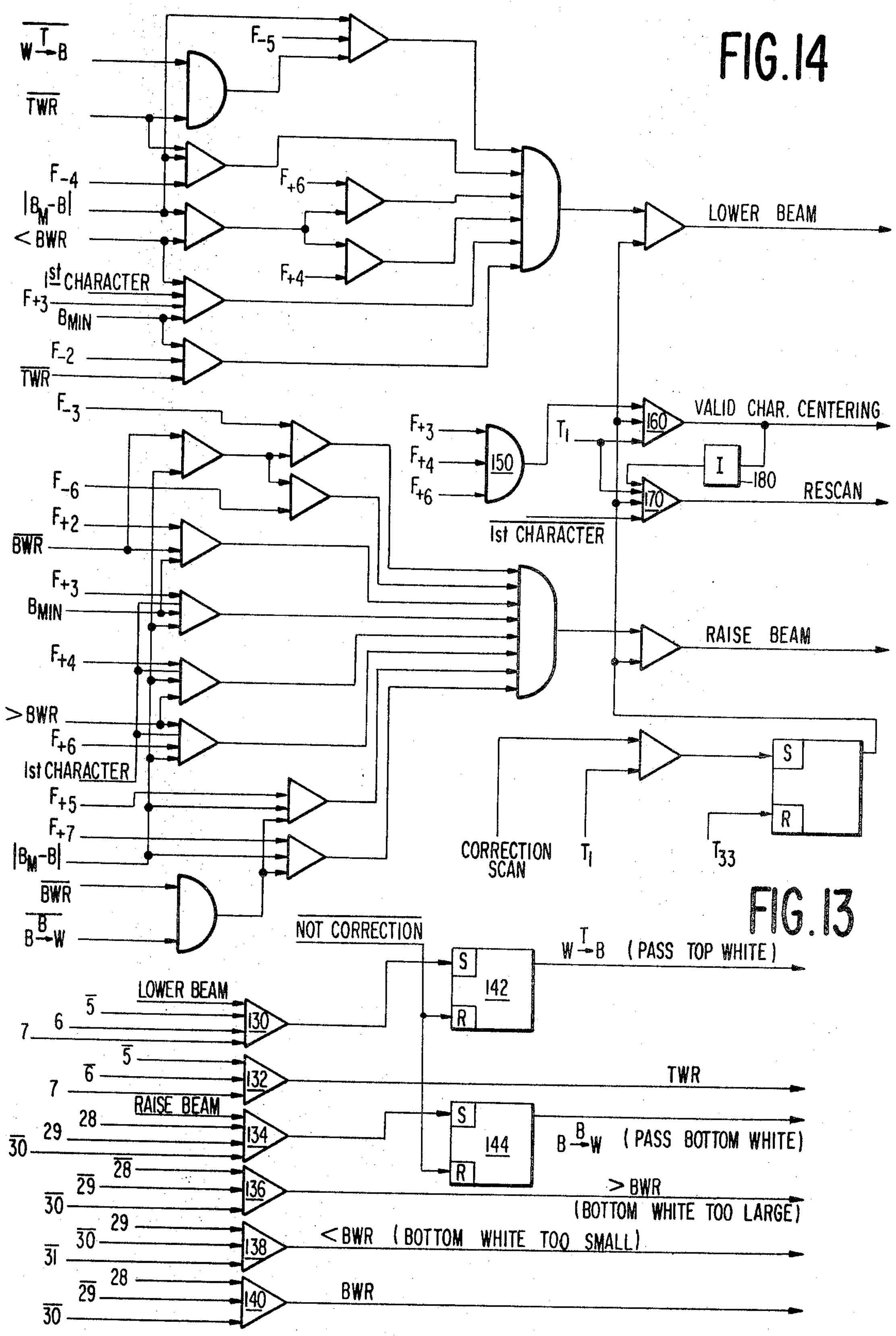

Conceptually, the feature reference logic, illustrated in FIG. 13, provides an indication of where the white spaces are in the consolidation pattern, and these indications are used to stop the raising or lowering of the beam during the correction scan when the white spaces are in the correct positions.

The major reference indications are TWR and BWR. TWR is the top white reference and the Boolean expression for it is $$TWR=\overline{5}\cdot\overline{6}\cdot 7$$

Translating this into words, this means that whenever the top of the raster is used as the reference during the correction scan, the raster reference point, which is being lowered, is stopped when the white space at the top of the reference is six bits long. The BWR reference is used during the correction span to stop the raising of the raster reference point when the white space at the bottom of the raster is four bits in length. When the latter occurs, stages 29 and 30 will contain 0's and stage 28 will contain a binary 1, thereby energizing AND gate 140. The output of AND gate 136 indicates that the bottom white space is too large and the output of AND gate 138 indicates that the bottom white space is too small.

It will be noted by referring to FIG. 4, that for some of the feature combinations it is necessary to pass up one of the white spaces completely before stopping the scan on a BWR or a TWR signal. For example, assume that at the beginning of a correction scan the consolidation register contains a feature combination corresponding to $F_{15}$. That means that the raster reference point is too high and should be lowered. It is desirable to lower the raster reference point (corresponding to raising the combination feature pattern) until the white space between the two black bars becomes the top white reference. However, it will be noted that at the start of the correction scan, there already is a white space at the top of the raster and corresponding to this there will be a series of zeros at the top of the consolidation register. If only a TWR indication were used to stop lowering the raster reference point, it is possible that the raster reference point would not be lowered enough. In order to compensate for this type of situation, and the corresponding type of situation which occurs when raising the beam, a pair of latches, 142 and 144, are provided. These latches are set by the outputs of AND gates 130 and 134 respectively. As can be seen from the logic inputs to the AND gates, there will be an output from latch 42 during a lowering of the scanner when the upper white space has already passed the stages 5, 6 and 7. The output of latch 44 indicates that the lowest white space has passed the stages 28 and 29. All of the outputs in block 5 are applied to the character centering and follow logics illustrated in FIG. 14.

Character Centering and Follow Logics

All of the logic blocks described thus far provide signal outputs which keep track of the feature combination in the consolidation register, the black magnitude criteria, and the relative positions of the black bars and white spaces of the feature combination stored within the consolidation register. All of these signals are applied to the character centering and follow logic of FIG. 14 which provides an output command to lower the raster reference position or raise the raster reference position. The outputs are in the form of gating voltages and it will be apparent to anyone having ordinary skill in the art that a gating voltage of controlled length may be used to raise or lower the raster reference position of a character recognition scanner by an amount proportional to the time duration of the gating voltage. The logic of FIG. 14 in effect mechanizes the raster correction rules of table I shown above. The Boolean expressions for lowering the beam which are carried out by the gates of FIG. 14 are:

$\text{Lower}=F_{-2}\cdot\overline{TWR}\cdot B_{min}$ $\text{Lower}=F_{-4}\cdot\overline{TWR}\cdot(B_m-\overline{B)}$ (1st character)

T $\text{Lower}=F_{-5}\cdot/B_m-B/\cdot(W\rightarrow B-\overline{TWR})$ $\text{Lower}=F_{+3}\cdot B_{min}\cdot(<BWR)$ $\text{Lower}=F_{+4}\cdot/B_m-B/\cdot(<BWR)$ $\text{Lower}=F_{+6}\cdot/B_m-B/\cdot(<BWR)$ The Boolean expressions for raising the beam carried out by the gates of Figure 14 are:

$\text{Raise}=F_{-5}\cdot/B_m-B/\cdot\overline{BWR}\cdot$ (1st character)

$\text{Raise}=F_{-6}\cdot/B_m-B/\cdot\overline{BWR}\cdot$ (1st character)

$\text{Raise}=F_{+2}\cdot B_{min}\cdot\overline{BWR}$ $\text{Raise}=F_{+3}\cdot B_{min}\cdot(>BWR)$ $\text{Raise}=F_{+4}\cdot/B_m-B/\cdot(\overline{>BW}R)$

B $\text{Raise}=F_{+5}\cdot/B_m-B/\cdot(B\rightarrow W+\overline{BWR})$ (1st character)

$\text{Raise}=F_{+6}\cdot/B_m-B/\cdot(\overline{>BW}R)$

B $\text{Raise}=F_{+7}\cdot/B_m-B/\cdot(B\rightarrow W+\overline{BWR})$

Considering the specific example of the situation resulting when the raster pattern is as shown in FIG. 3, the feature combination resulting will be $F_{13}$. When the latter occurs and the black magnitude criteria is satisfied, $F_{13}$ identifies the feature combination; the absolute value $/B_m-B/$ identifies that the black magnitude criteria has been satisfied, and $\overline{BWR}$ identifies that the white space is not at the proper position. The generation of the latter condition signals satisfies the first Boolean expression for raising the beam. Thus, the raise beam output is generated causing the raster reference position to be raised. Also, as explained previously in connection with the description of the consolidation register 100, the feature combination in the consolidation register will be shifted down in response to the generation of a raise beam command. When the white space in a feature combination pattern of $F_{13}$ moves down to the bottom of the consolidation register, the logic of FIG. 13 generates the signal BWR thereby removing the signal $\overline{BWR}$ resulting in the termination of the raise beam command.

Thus, it can be seen that the present invention provides feedback control to the consolidation register to slew the data in the register so that it effectively follows the correction movement of the scanner during the correction mode. By slewing the data in this manner it serves as a continuing cue of the position of the scanner relative to the line of characters.

After centering on the first character of each line it may be desirable to prevent further correction on the remaining characters of the line provided they satisfy one of certain selected feature combinations. According to the specific embodiment described herein only the feature combination patterns $F_{+3}$, $F_{+4}$ and $F_{+6}$ will be detected as validly centered characters following the raster beam correction on the initial character. This is carried out by the centering validity logics which comprise gates 150, 160, 170 and 180 in FIG. 14. At the end of the recognition scan on every character AND gate 160 indicates that the character is satisfactorily centered. If the character is not satisfactorily centered and it is not the first character in the line, AND gate 170 provides an output to the character recognition system which tells it that the character is off center and so a rescan is desirable. If a rescan is instituted the character will have been properly centered during the time of the correction scan by the character centering and follow logics. Note that in the example herein, it is assumed that the recognition scan is a raster scan and thus horizontal consolidation and centering is carried out on all characters in the line.

As stated above, following the initial centering characters producing feature combinations $F_{+3}$, $F_{+4}$ and $F_{+6}$ are satisfactory. Thus, there is no need to perform a correction when the latter feature combinations exist. The term "1st character" in the Boolean expression (and in the gating circuitry of FIG. 14) prevents further correction when those feature combinations are generated.

While the invention has been particularly shown and described with reference to preferred embodiments thereof, it will be understood by those skilled in the art that various changes in form and details may be made therein without departing from the spirit and scope of the invention.

What I claim is:

1. Apparatus responsive to electronic signals representing character bits and background bits resulting from a raster scan of a field in which there may be a character or character parts, for generating a raster centering output having a parameter proportional to the amount said scan is to be adjusted to center a character within a field of said raster scan, said output being in the form of a command signal to raise the raster scan field a given amount or lower the raster scan field a given amount, comprising:

a. storage means, receiving said character and background bits (hereinafter referred to as black and white bits respectively) for forming and storing a feature combination pattern which is an electronic replica of horizontally compressed characters, character parts and spaces within said field, wherein a group of sequentially stored black bits (referred to hereafter as a black bar) represents a compressed character or character part, and a group of sequentially stored white bits (referred to hereafter as a white space) represents spaces between characters, b. means responsive to the size and positions of said black bars in said stored feature combination pattern for generating said raster centering output, and c. control means for initiating said means for forming said feature combination pattern following the interception of a character part during said raster scan and for providing a control signal to said generating means for initiating said raster centering output in response to an indication that said raster scan has passed a character, the period during the scan of a character being the consolidation time and the period following the scan of a character being the correction time, wherein said storing means comprises, an up-down shift register having a storage length equal to the character and background bits received during a single vertical scan of said raster scan, means for shifting the contents of said shift register in a first direction during said consolidation time in coincidence with each vertical sweep of said raster scan whereby a signal representing a black or white bit is shifted from the input to the output during a single vertical scan, and means for applying all black bits received as a result of each vertical scan and all black bits shifted out of said shift register to the input of said shift register during said raster scan whereby black bits are accumulated forming black bars representing character lengths and positions within said raster field.

2. Apparatus responsive to electronic signals representing character bits and background bits resulting from a raster scan of field in which there may be a character or character parts, for generating a raster centering output having a parameter proportional to the amount said scan is to be adjusted to center a character within a field of said raster scan, said output being in the form of a command signal to raise the raster scan field a given amount or lower the raster scan field a given amount, comprising:

a. storage means, receiving said character and background bits (hereafter referred to as black and white bits respectively) for forming and storing a feature combination pattern which is an electronic replica of horizontally compressed characters, character parts and spaces within said field, wherein a group of sequentially stored black bits (referred to hereafter as a black bar) represents a compressed character or character part, and a group of sequentially stored white bits (referred to hereafter as a white space) represents spaces between characters, b. means responsive to the size and positions of said black bars in said stored feature combination pattern for generating said raster centering output, and c. control means for initiating said means for forming said feature combination pattern following the interception of a character part during said raster scan and for providing a control signal to said generating mans for initiating said raster centering output in response to an indication that said raster scan has passed a character, the period during the scan of a character being the consolidation time and the period following the scan of a character being the correction time, wherein, said means for generating said raster centering output comprises, feedback means, responsive to said raster centering output, for shifting the position of said feature combination pattern in said storing means, means responsive to said feature combination pattern reaching a predetermined reference position is said storing means, representing a centering of said raster field on said character, for terminating said raster centering output, and feature pattern combination logic, responsive to said black and white bits entered into said storage means, for generating a feature combination output signal identifying the particular feature combination in said storing means.

3. Apparatus as claimed in claim 2 wherein said storing means comprises a. an up-down shift register having a storage length equal to the character and background bits received during a single vertical scan of said raster scan, b. means for shifting the contents of said shift register in a first direction during said consolidation time in coincidence with each vertical sweep of said raster scan whereby a signal representing a black or white bit is shifted from the input to the output during a single vertical scan, c. means for applying all black bits received as a result of each vertical and all black bits shifted out of said shift register to the input of said shift register during said raster scan whereby black bits are accumulated forming black bars representing character lengths and positions within said raster field.

4. Apparatus as claimed in claim 3 wherein said feature combination logic comprises a. feature sign indicating means responsive to the first bit received from said scanner during each vertical scan for indicating whether a character or space is at the bottom of said raster field of view, b. feature counting means responsive to the bits entered into said shift register for counting the number of changes from black to white and white to black during each vertical scan, and c. means for providing a signal indicating which of the black bars in said stored feature combination pattern is the largest, said feature combination output signal being a logic combination of the outputs from said latter means, said feature counting means, and said feature sign indicating means.

5. Apparatus as claimed in claim 4 wherein said means for terminating said raster centering output comprises a. plural feature reference logic circuit means for generating plural decision outputs, each being generated in response to said pattern occupying a different reference position in said shift register, and b. means for selecting a decision output to stop said raster said centering output, said selection being dependent upon the particular feature combination stored in said shift register during said raster scan.

UNITED STATES PATENT OFFICE
CERTIFICATE OF CORRECTION

Patent No. 3,587,047 Dated June 22, 1971

Inventor(s) Alfred Cutaia

It is certified that error appears in the above-identified patent and that said Letters Patent are hereby corrected as shown below:

| | | |
|---|---|---|
| Col. 2, Line | 46 | Insert Comma after "1" |
| Col. 3, Line | 2 | "F14" should be "F-4" |
| " " " | 7 | "F13" should be "F-3" |
| " " " | 14 | "F1" should be "F-" |
| " " " | 24 | "F13" should be "F-3" |
| " " " | 29 | "F13 should be "F-3" |
| " " " | 57 | "f+4 should be "F+4" |
| Col. 4, Line | 24 | "B 25.25" should be "B 25" |
| " " " | 43 | "F13" should be "F-3" |
| " " " | 44 | "F13" should be "F-3" |
| Col. 6, Line | 48 | "F1" should be "F-" |
| " " " | 52 | "indicated" should be "indicates" |
| Col. 7, Line | 3 | "F1" should be "F-" |
| " " " | 6 | "F1" should be "F-" |
| " " " | 6 | "B1" should be "B-" |
| " " " | 11 | "B1" should be "B-" |
| " " " | 14 | "B1" should be "B-" |
| " " " | 15 | "F16" should be "F-6" |
| " " " | 16 | "B1" should be "B-" |
| " " " | 28 | "F16" should be "F-6" |
| " " " | 29 | "F16" should be "F-6" |
| " " " | 31 | "F16" should be "F-6" |
| " " " | 33 | "B1" should be "B-" |
| " " " | 34 | "F16" should be "F-6" (twice) |
| " " " | 35 | "F1" should be "F-" |
| " " " | 36 | "F16" should be "F-6" |
| " " " | 37 | "F16 = ($B_1$)(FAX 1). (CA4) should be "F-6=(B-).F-). (C4)" |

FORM PO-1050 (10-69)

USCOMM-DC 60376-P69
☆ U.S. GOVERNMENT PRINTING OFFICE : 1969 O—366-334

UNITED STATES PATENT OFFICE
CERTIFICATE OF CORRECTION

Patent No. 3,587,047 Dated June 22, 1971

Page - 2

Inventor(s) Alfred Gtaia

It is certified that error appears in the above-identified patent and that said Letters Patent are hereby corrected as shown below:

| | | |
|---|---|---|
| Col. 8 | Line 28 | "B1" should be B-" |
| Col. 9 | Line 23 | "F15" should be "F-5" |
| " " | " 68-70 | Second and third Boolen expressions so close together that some may not be clear |
| " " | " 68-78 | Parts of all Boolean expressions not Printed clear enough to read |
| Col. 10 | Line 11 | "F13" should be "F-3" |
| " " | " 12 | "F13" should be "F-3" |
| " " | " 23 | "F13" should be "F-3" |
| Col. 12 | Line 60 | before "centering" delete "said" |
| " " | " 11 | "position is" should be "position in" |

Signed and sealed this 11th day of April 1972.

(SEAL)
Attest:

EDWARD M.FLETCHER,JR.
Attesting Officer

ROBERT GOTTSCHALK
Commissioner of Patents